(12) United States Patent
Lord

(10) Patent No.: US 8,572,373 B2
(45) Date of Patent: Oct. 29, 2013

(54) METHOD, APPARATUS AND SYSTEM FOR SECURE ELECTRONIC MAIL

(75) Inventor: Robert B. Lord, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1236 days.

(21) Appl. No.: 11/565,328

(22) Filed: Nov. 30, 2006

(65) Prior Publication Data

US 2008/0134313 A1    Jun. 5, 2008

(51) Int. Cl.
*H04L 29/06*   (2006.01)

(52) U.S. Cl.
USPC .......................... 713/168; 713/170; 713/175

(58) Field of Classification Search
USPC ................... 713/156, 168, 170, 175
See application file for complete search history.

(56) References Cited

U.S. PATENT DOCUMENTS

| | | | |
|---|---|---|---|
| 6,904,521 B1 * | 6/2005 | Jivsov | 713/155 |
| 7,174,368 B2 * | 2/2007 | Ross, Jr. | 709/207 |
| 7,321,969 B2 * | 1/2008 | Schoen et al. | 713/153 |
| 7,421,472 B1 * | 9/2008 | Ross, Jr. | 709/206 |
| 2002/0143885 A1 * | 10/2002 | Ross, Jr. | 709/207 |
| 2003/0126085 A1 * | 7/2003 | Srinivasan | 705/51 |
| 2003/0204722 A1 * | 10/2003 | Schoen et al. | 713/156 |
| 2003/0217259 A1 * | 11/2003 | Wong et al. | 713/153 |
| 2004/0168055 A1 * | 8/2004 | Lord et al. | 713/156 |
| 2005/0149442 A1 * | 7/2005 | Adams et al. | 705/51 |
| 2005/0229258 A1 * | 10/2005 | Pigin | 726/27 |
| 2006/0064581 A1 * | 3/2006 | Miller et al. | 713/156 |
| 2006/0168004 A1 * | 7/2006 | Choe et al. | 709/206 |
| 2007/0005713 A1 * | 1/2007 | LeVasseur et al. | 709/206 |
| 2007/0027955 A1 * | 2/2007 | Voss et al. | 709/206 |
| 2007/0113101 A1 * | 5/2007 | LeVasseur et al. | 713/189 |

OTHER PUBLICATIONS

Microsoft Office 2000 User Manual, 1999, Que Corporation, pp. 673-674.*
Microsoft Office 2000 Resource Kit, 1999, Microsoft Press, pp. 414-419.*

* cited by examiner

*Primary Examiner* — Bradley Holder
(74) *Attorney, Agent, or Firm* — Lowenstein Sandler LLP

(57) ABSTRACT

An embodiment relates generally to a method of selecting certificates. The method includes invoking a send option for an email client and displaying a send mail user interface for the email client. The method also includes displaying a default certificate in a graphical user element in the send mail user interface.

13 Claims, 4 Drawing Sheets

ABSTRACTED OUTPUT:

METHOD, APPARATUS AND SYSTEM FOR SECURE ELECTRONIC MAIL

FIELD

This invention relates generally to certificates, more particularly, embodiments relate to methods, apparatus, and systems for secure electronic mail.

DESCRIPTION OF THE RELATED ART

Secure enterprise systems are an effective way to securely communicate and access information. These secure systems typically use cryptographic keys, smart cards, biometrics, and/or certificates to secure access and data.

A user in a secure enterprise system may interact with a variety groups, each group requiring a unique and secure method of access As a result, the user may acquire multiple credentials in order to securely communicate with each group. For example, in a situation where a user is interacting with several federal agencies, e.g., Department of Defense ("DOD") and Department of Energy ("DOE"), the user may use his DOD credentials to interact with the DOD and his DOE credentials to interact with the DOE.

The user may attempt to ensure that the proper credentials are applied to the correct recipient in transmitting messages. However, the typical electronic mail application does not provide a method that allows the user to quickly determine which credential is being used or to efficiently switch to another set of credentials.

SUMMARY

An embodiment relates generally to a method of selecting certificates. The method includes invoking a send option for an email client and displaying a send mail user interface for the email client. The method also includes displaying a default certificate in a graphical user element in the send mail user interface.

Another embodiment pertains generally to an apparatus for secure electronic mail. The apparatus includes a certificate database configured to store a plurality of certificates, where each certificate is associated with an entity. The apparatus also includes an email client configured to interface with the certificate database, where the email client is also configured to display a send mail interface in response to an invocation of a send mail option of the email client. The email client is further configured to display a default certificate of the plurality of certificates on the send mail interface.

Yet another embodiment relates generally to a system for secure electronic mail. The system includes a plurality of entities, each entity having at least one certificate and at least one client configured to store and execute an electronic mail ("email") client and interfaced with a respective certificate database. The system also includes a network configured to provide a communication channel between the plurality of entities and the at least one client. Each email client is configured to display a send mail interface in response to an invocation of a send mail option of the email client and display a default certificate of the plurality of certificates on the send mail interface.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to a method and apparatus for selecting a certificate from a plurality of certificates on a message-by-message basis. More specifically, an email client may be configured to display a user interface (UI) that displays a current certificate and a scroll box to reset the current certificate. The user interface may include a graphical user element such as a drop down list element that contains the list of certificates associated with the user. When the email client is invoked, the user interfaces displays the current certificate, which may be set in an options menu of the email client. Accordingly, a user may easily view the current certificate for a pending email message and also easily change the certificate by using the drop down list for the appropriate recipient. In other embodiments, the certificate selection may be included in an instant messaging client.

Figure 1:
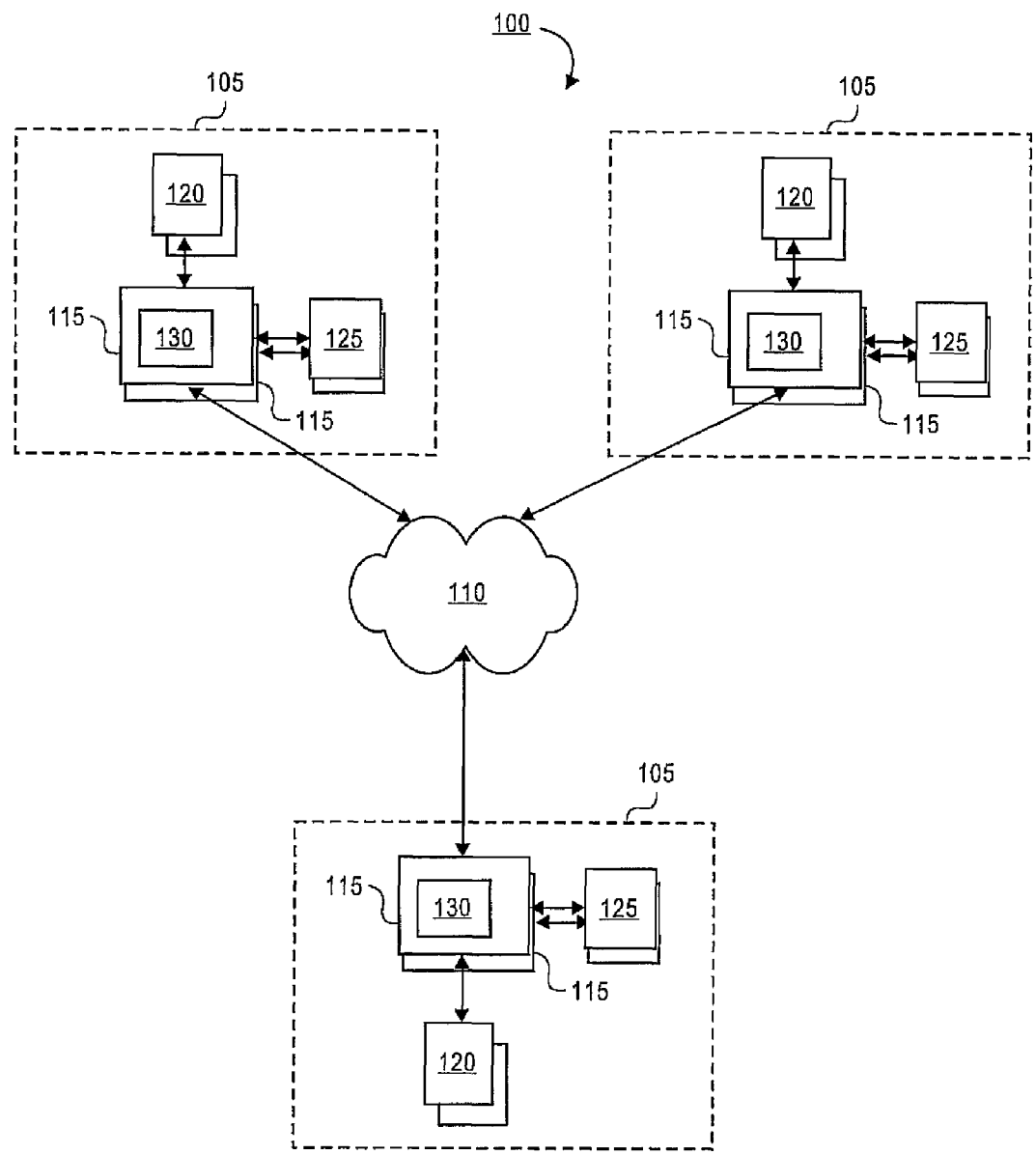
FIG. 1 illustrates an exemplary system in accordance with an embodiment.

FIG. 1 illustrates an exemplary system where embodiments may be practiced. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 may include entities 105 interconnected by network 110. Each entity 105 may represent an organization, business, institution, government agency such as a defense contractor, a local county public agency, a corporation, etc. Each entity 105 may have a plurality of clients 115 within the respective entity. Each client 115 may be a computing platform such as a personal computer, a workstation, a mobile device, etc. Each client 115 may also execute an operating system to execute applications, generate and save information, interact with peripherals and communicate with other users in the entities.

Each client 115 may also include a security device 120. Each user may be issued a security token to be inserted into the security device 120 to access the connected client 115. The security token may be implemented as a smart card, a flash drive, and other similar security devices. The security token is bound or assigned to the user. The security token can be configured to store certificates associated with the user. In some embodiments, the security token conforms to X.509 standard as known to those skilled in the art. A certificate may be issued to a user by a system administrator and/or security officer of an entity 105. The certificate may be a mechanism for the issuing entity to prove (or verify) the user. For example, a user in a defense contractor entity may have one certificate to communicate with users within the defense contractor entity. The same user may have a second certificate to communicate with users within a government defense entity. An entity is not limited to issuing a single certificate for a particular user. The entity may issue multiple certificates in the event that entity has multiple groups, each group having a separate certificate.

The plurality of clients 115 may communicate among themselves over the network 110. The network 110 may be a local area network, a wide area network or a combination thereof. For example, each entity 105 may maintain a local or wide area network to facilitate communication within as well as connecting to other users in the other entities 105 through the Internet.

One method of communicating between the clients 115 is the use of an email client 125 executing thereon. In some embodiments, the email client 125 may include an instant messaging feature or be replaced by an instant messaging client. The email client 125 may be electronic mail application such as Outlook, Thunderbird, or other similar applications modified with an embodiment of the invention. More particularly, a certificate module may be incorporated into the email client 125 as an applet or plug-in that configures a send mail interface to display a graphical element within the send mail interface. The graphical element may contain the name of the default certificate for the user. A user may then select a different certificate that is associated with the user by selecting the graphical element. When the graphical element is activated, a list of certificates associated with the user may be displayed. The user may scroll through the list of certificates to select a second certificate to associate with the electronic mail message.

The graphical element may be implemented as a drop down list element. Other embodiments may have the graphical element as an icon on a toolbar, a menu bar or other user interface constructs as known to those skilled in the art. The programming of the certificate module may be accomplished using languages such as JAVA, XML, C++ or other object oriented languages.

Figure 2:
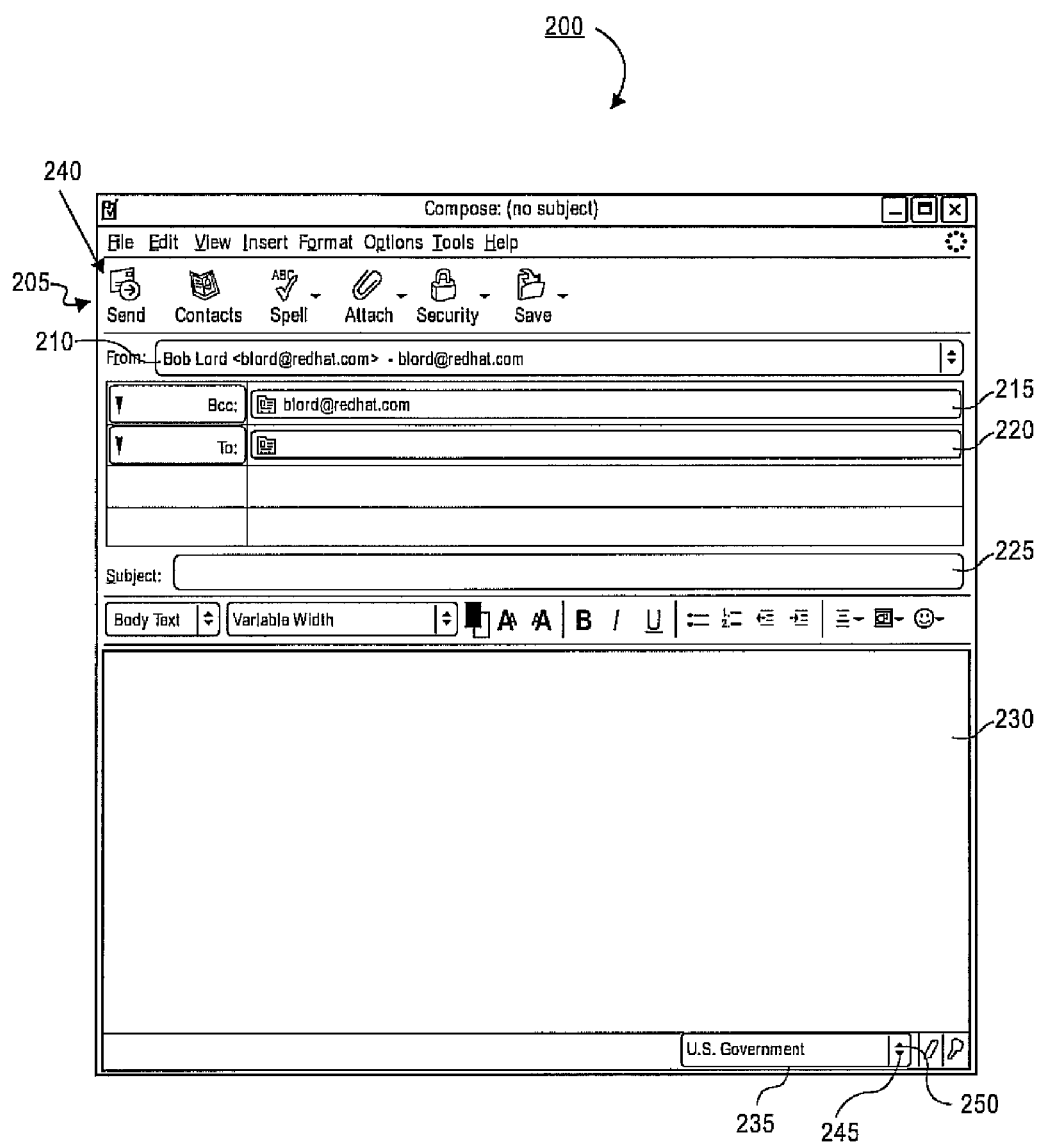
FIG. 2 illustrates an exemplary send mail interface in accordance with another embodiment.

Accordingly, a user may activate the send mail option of the email client 125. For example, in an Outlook mail client, the user activates the "NEW" mail message on a menu bar. The email client 125 then generates a send mail interface with the certificate graphical element displayed on the send mail interface as shown in FIG. 2. FIG. 2 illustrates an exemplary send mail interface 200 in accordance with another embodiment. It should be readily apparent to those of ordinary skill in the art that the send mail interface 200 depicted in FIG. 2 represents a generalized schematic illustration and that other components may be added or existing components may be removed or modified.

As shown in FIG. 2, the send (or new) mail interface 200 may include a menu bar 205, a sender field 210, a blind carbon copy field 215, a recipient field 220, a subject field 225, a text body field 230 and the certificate graphical element 235.

The menu bar 205 of the send mail interface 200 may be configured to allow the user to implement send mail functions. For example, menu bar 205 includes a send icon 240 which allows a user to transmit the generated message to the designated recipients listed in the recipient field 220 and/or blind copy field 215.

The sender field 210 may indicate the electronic mail address of the sender. The blind copy field 215 may be configured to add recipients for the message such that these recipients do not receive any indication of any co-recipients. The recipient field 220 may indicate the recipient(s) for the generated message. Unlike the recipients in the blind copy field 215, these recipients may receive an indication of the co-recipients.

The subject field 225 may allow a user to enter text that describes the subject or purpose of the electronic message. The text field 230 may allow a user to enter text. The certificate graphical element 235 may be configured to indicate the default certificate (or associated name) set by the user. As shown in FIG. 2, the default certificate is set to the "U.S. Government". In accordance with various embodiments, a user may activate, i.e., click on, the certificate graphical element 235 to display the rest of the certificates also associated with the user. For example, the list may include the default certificate along with an internal corporate certificate, a client certificate, a customer certificate and so on. The list of certificates may be populated by a certificate module from either an inserted token or a certificate database. The user may use the radio buttons 245, 250 to scroll down and up through the list of certificates. The user may then select a second certificate from the list of certificates to change from the default certificate. Accordingly, the email client 125 may associate the selected certificate with the electronic mail message for transmission to the intended recipients.

Figure 3:
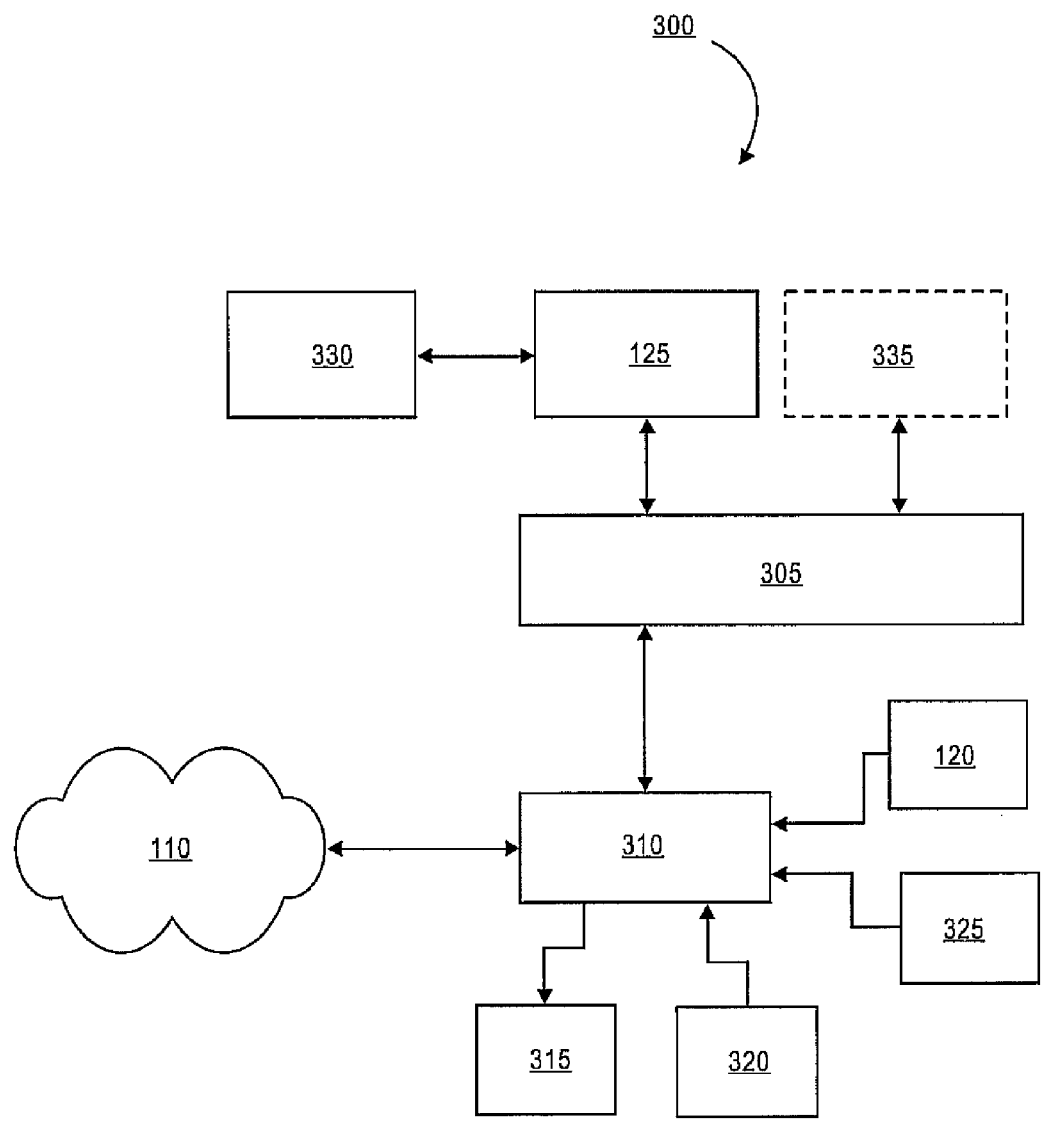
FIG. 3 illustrates an exemplary architecture diagram in accordance with yet another embodiment.

FIG. 3 illustrates an exemplary block diagram 300 for the client 115 in accordance with yet another embodiment. It should be readily apparent to those of ordinary skill in the art that the block diagram 300 depicted in FIG. 3 represents a generalized schematic illustration and that other components may be added or existing components may be removed or modified.

As shown in FIG. 3, diagram 300 includes the email client 125, an operating system 305, and device drivers 310. The operating system 305 may allocate execution and memory services to the email client 125 for providing its functionality to a user. The operating system 305 may be implemented as a single-user or multi-user operating systems such as Windows, Linux, Unix, etc. In some embodiments, the email client 125 may include an instant messaging function or be replaced by an instant messaging client.

The operating system 305 may also provide the device drivers 310 for the user to access the peripherals attached to the client 115. The peripherals may be a display 315, a keyboard 320, a mouse 325 and the security device 120. The device drivers 310 also provide a mechanism to access the network 110.

The email client 125 may also be executing a certificate module 330. The certificate module 330 may be an applet, plug-in and/or patch that configures the email client 125 to provide a mechanism for a user to display a current certificate or change to another certificate. In accordance with various embodiments, when the email client 125 is invoked, the certificate module 330 may query the token inserted into the security device 120 for a list of certificates associated with the user. Alternatively, the client 115 may contain a secure database (e.g., certificate database 335 shown in FIG. 3) that securely stores the certificates of the user. The token may contain the cryptographic keys that allow access the secure certificate database 335. The certificate module 330 may then query the email client for the default setting for the user.

Accordingly, when a user activates the send or new mail message functionality of the email client 125, the certificate module 330 may populate the certificate graphical element 235 with the list of certificates and set the display to the default certificate. Similarly, other embodiments with an instant messaging client can incorporate the certificate module 300 to allow a user to select a list of certificates.

Figure 4:
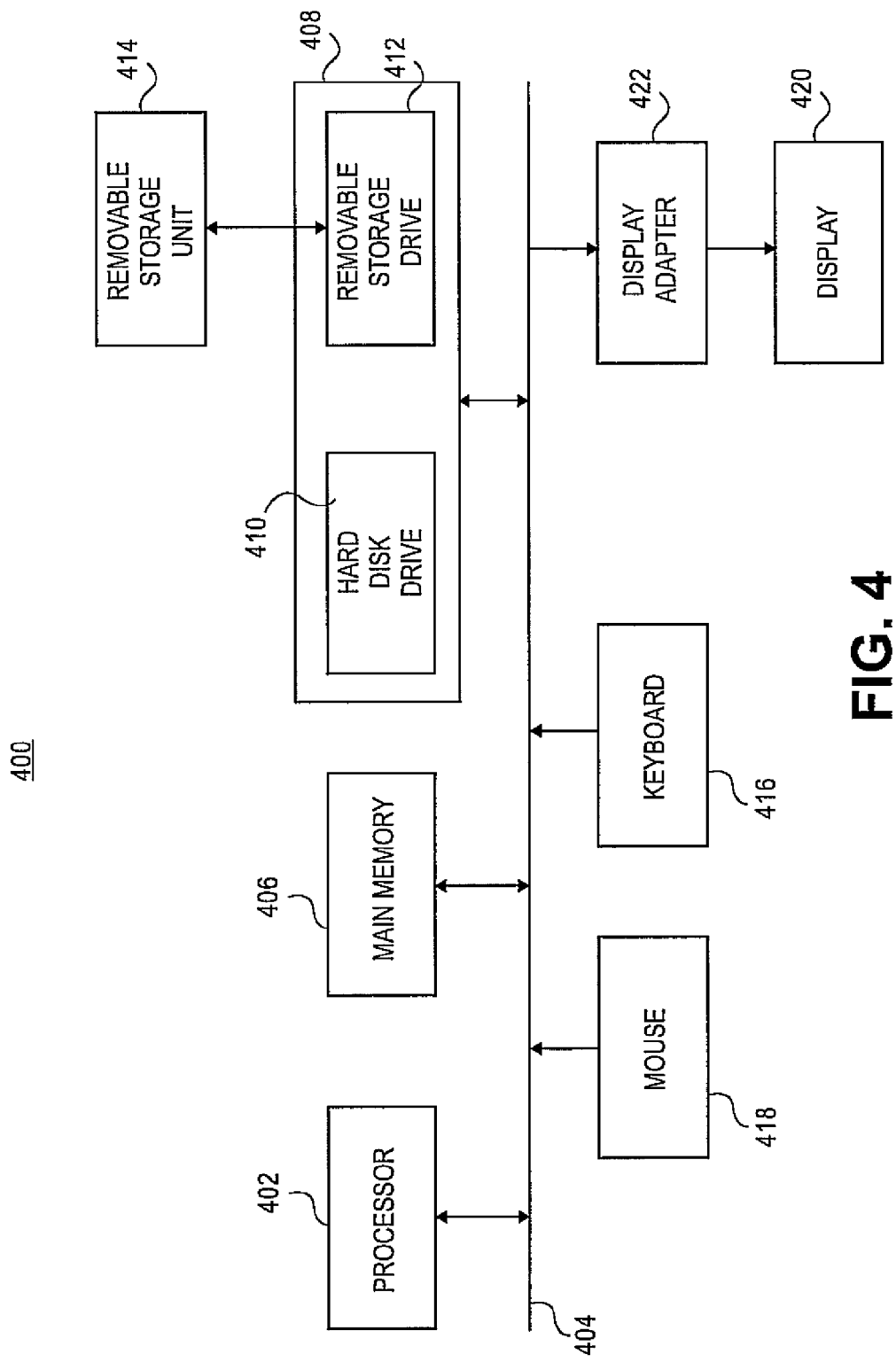
FIG. 4 illustrates an exemplary computing platform.

FIG. 4 illustrates an exemplary block diagram of a computing platform 400 where an embodiment may be practiced. The functions of the email client and certificate module may be implemented in program code and executed by the computing platform 400. The email client and certificate module may be implemented in computer languages such as PASCAL, C, C++, JAVA, etc.

As shown in FIG. 4, the computer system 400 includes one or more processors, such as processor 402 that provide an execution platform for embodiments of the email client (or instant messaging client) and certificate module. Commands and data from the processor 402 are communicated over a communication bus 404. The computer system 400 also includes a main memory 406, such as a Random Access Memory (RAM), where the email client and certificate module may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the email client and certificate module may be stored. The removable storage drive 412 reads from and/or writes to a removable storage unit 414 in a well-known manner. A user interfaces with the email client and certificate module with a keyboard 416, a mouse 418, and a display 420. The display adapter 422 interfaces with the communication bus 404 and the display 420. The display adapter also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
displaying a message interface in a messaging client, the messaging client to generate a message for transmission from a sender, wherein the message interface to receive the message;
displaying, in the message interface, a certificate interface, the certificate interface comprising a first default certificate associated with the message;
displaying, in the message interface, a certificate selection interface, the certificate selection interface comprising a list of a plurality of certificates to be selected by the sender, wherein the certificate selection interface to display the list of the plurality of certificates stored in a certificate database in response to activating the certificate selection interface, and wherein access to the certificate database is granted to the messaging client in view of a presence of a security token;
receiving, from the sender via the certificate selection interface, a selection of a second certificate from the list of the plurality of certificates;
associating, by a processor, the message entered in the message interface with the selected second certificate; and
transmitting the message using the selected second certificate.

2. The method of claim 1, further comprising:
invoking the message interface of the messaging client for a second time; and
displaying the message with the second certificate in the message interface.

3. The method of claim 1, further comprising:
invoking the message interface of the messaging client for a second time; and
displaying the message with a default certificate in the message interface.

4. The method of claim 1, further comprising:
transmitting the message with the selected second certificate associated with the sender.

5. The method of claim 1, wherein the messaging client is an electronic mail client.

6. The method of claim 1, wherein the messaging client is an instant messaging client.

7. An apparatus for secure electronic mail, comprising:
a processor; and
a memory coupled to the processor, the memory to store:
a certificate database structure to store a plurality of certificates, each certificate associated with a sender of messages; and
an email client, executable by the processor, and to:
interface with the certificate database;
display a send mail interface in response to an invocation of a send mail option of the email client to generate a message for transmission from the sender, wherein the send mail interface to receive the message;
display, in the send mail interface, a certificate interface, the certificate interface comprising a first default certificate associated with the message;
display, in the send mail interface, a certificate selection interface comprising a list of the plurality of certificates to be selected by the sender, wherein the certificate selection interface to display the list of the plurality of certificates stored in a certificate database in response to activating the certificate selection interface, and wherein access to the certificate database is granted to the email client in view of a presence of a security token;

receive, from the sender via the certificate selection interface, a selection of a second certificate from the list of the plurality of certificates;

associate the message entered in the send mail interface with the selected second certificate of the plurality of certificates; and transmit the message using the selected second certificate.

8. The apparatus of claim 7, wherein the email client further to redisplay the send mail interface with the second certificate in the send mail interface in response to a second activation of the send mail option.

9. A system for secure electronic mail, the system comprising:

at least one email client to store and execute an electronic mail client and interfaced with a certificate database comprising a plurality of certificates, each certificate associated with a sender of the email, the at least one client comprising a computer processor; and a computer network to provide at least one communication channel, wherein the at least one email client to:

display a send mail interface in response to an invocation of the email client, wherein the send mail interface to receive a message to be sent from the sender;

display, in the send mail interface, a certificate interface, the certificate interface comprising a first default certificate associated with the message;

display, in the send mail interface, a certificate selection interface comprising a list of the plurality of certificates to be selected by the sender from the certificate database, wherein the certificate selection interface to display the list of the plurality of certificates stored in a certificate database in response to activating the certificate selection interface, and wherein access to the certificate database is granted to the email client in view of a presence of a security token;

receive, from the sender via the certificate selection interface, a selection of a second certificate from the list of the plurality of certificates;

associate, by the computer processor, the message entered in the send mail interface with the selected second certificate; and transmit the message using the selected second certificate.

10. The system of claim 9, wherein the email client further to redisplay the send mail interface with the second certificate in response to a second activation of the email client.

11. The system of claim 9, wherein the email client further to generate the message entered in the send mail interface and associate the default certificate with the message, and to transmit the message with the associated default certificate.

12. A non-transitory machine-readable medium storing instructions which, when executed, cause a computer processor to perform operations comprising:

displaying a message interface in a messaging client to generate a message for transmission from a sender, wherein the message interface to receive the message;

displaying, in the message interface, a certificate interface, the certificate interface comprising a first default certificate associated with the message;

displaying, in the message interface, a certificate selection interface, the certificate selection interface comprising a list of a plurality of certificates to be selected by the sender, wherein the certificate selection interface to display the list of the plurality of certificates stored in a certificate database in response to activating the certificate selection interface, and wherein access to the certificate database is granted to the messaging client in view of a presence of a security token;

receiving, from the sender via the certificate selection interface, a selection of a second certificate from the list of the plurality of certificates;

associating, by a processor, the message entered in the message interface with the selected second certificate; and transmitting the message using the selected second certificate.

13. The non-transitory machine-readable medium of claim 12, wherein the messaging client is an electronic mail client.

\* \* \* \* \*